US010612911B1

(12) United States Patent
Pena, III et al.

(10) Patent No.: US 10,612,911 B1
(45) Date of Patent: Apr. 7, 2020

(54) FIBER OPTIC SYSTEM FOR MONITORING DISPLACEMENT OF A STRUCTURE USING QUATERNION KINEMATIC SHAPE SENSING

(71) Applicant: United States of America as Represented by the Administrator of NASA, Washington, DC (US)

(72) Inventors: Francisco Pena, III, Valencia, CA (US); Allen R. Parker, Jr., Lancaster, CA (US); William Lance Richards, Palmdale, CA (US); Hon Man Chan, Canyon Country, CA (US)

(73) Assignee: United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 35 days.

(21) Appl. No.: 16/120,555

(22) Filed: Sep. 4, 2018

Related U.S. Application Data (60) Provisional application No. 62/555,416, filed on Sep. 7, 2017.

(51) Int. Cl.
*G01B 11/16* (2006.01)
*G01L 1/24* (2006.01)

(52) U.S. Cl.
CPC ............ *G01B 11/165* (2013.01); *G01L 1/246* (2013.01)

(58) Field of Classification Search
CPC .............................. G01B 11/165; G01L 1/246
USPC .......................................................... 73/775
See application file for complete search history.

(56) References Cited

U.S. PATENT DOCUMENTS

| 3,755,658 A | * | 8/1973 | Walters | ..................... G06G 7/68 |
| | | | | 702/42 |
| 5,726,744 A | * | 3/1998 | Ferdinand | ............... G01L 1/246 |
| | | | | 250/227.14 |
| 6,586,722 B1 | | 7/2003 | Kenny et al. | |

(Continued)

OTHER PUBLICATIONS

Dunphy et al, "Optical Fibre Bragg Grating Sensors: A Candidate for Smart Structure Applications", Chapter 10 in Fibre Optic Smart Structures, edited by Eric Udd, 1995, John Wiley & Sons, ISBN 0-471-55448-0.

(Continued)

*Primary Examiner* — Octavia Hollington (57) ABSTRACT

A method and system for rendering the quaternion shape and orientation of a three-dimensional structure. The proposed system and method keeps track of twist/roll angles and updates its effect on pitch and yaw orientations. The system relies on a single or multi-core optical fiber or multi-fiber bundle containing fiber Bragg grating sensors (FBGs) arrayed in rosettes at 45° deltas and spaced at uniform intervals along the entire length of the structure to be monitored. A tunable laser is used to interrogate the sensors using optical frequency domain reflectometry (OFDR), which detects shifts in the wavelength reflected by the sensors in response to strain on the fibers. Each sensor is continuously queried by software which determines the strain magnitude (ΔL/L) for each fiber at a given triplet. Given these measured strain values, the software implements a novel quaternion approach to rendering the 3D shape of the fiber including twist.

17 Claims, 4 Drawing Sheets

(56) References Cited

U.S. PATENT DOCUMENTS

| | | | |
|---|---|---|---|
| 7,703,331 B2* | 4/2010 | Magne | E21B 43/01 |
| | | | 73/766 |
| 7,813,599 B2 | 10/2010 | Moore | |
| 8,714,026 B2* | 5/2014 | Froggatt | G01D 5/35306 |
| | | | 73/800 |
| 8,773,650 B2 | 7/2014 | Froggatt et al. | |
| 8,970,845 B1 | 3/2015 | Chan et al. | |
| 10,209,060 B1* | 2/2019 | Nguyen | G01D 5/35316 |
| 10,324,026 B2* | 6/2019 | Chapuis | G01M 11/085 |
| 2013/0205910 A1* | 8/2013 | Gharib | G01B 5/0014 |
| | | | 73/777 |
| 2018/0303383 A1* | 10/2018 | Connor | G01B 7/22 |

OTHER PUBLICATIONS

S. Magne et al, "State of Strain Evaluation With Fibre Bragg Grating Rosettes", Applied Optics, Dec. 20, 1997, vol. 36, No. 36, pp. 9437-9447.

* cited by examiner

FIBER OPTIC SYSTEM FOR MONITORING DISPLACEMENT OF A STRUCTURE USING QUATERNION KINEMATIC SHAPE SENSING

CROSS-REFERENCE TO RELATED APPLICATIONS

The present application derives priority from U.S. provisional patent application Ser. No. 62/555,416 filed on 7 Sep. 2017.

STATEMENT OF GOVERNMENT INTEREST

The invention described hereunder was made in the performance of work under a NASA contract, and is subject to the provisions of Public Law #96-517 (35 U.S.C. 202) in which the Contractor has elected not to retain title.

BACKGROUND OF THE INVENTION

1. Field of the Invention

The present invention relates to optical fiber sensing systems and, more specifically, to a method and system of rendering displacement of shape and/or orientation of a three-dimensional aerospace structure in real time based on measured fiber strain data using quaternion kinematic shape sensing.

2. Description of the Background

The ability to determine the displacement of a structure in shape and/or orientation is of great importance to the science of Structural Health Monitoring (SHM). Generally, SHM involves the observation of a structure over time using periodically sampled measurements from an array of sensors, and the analysis of these measurements to determine the current state of structural health.

Fiber optics are playing an expanding role in the field of SHM and fiber optic sensors are increasingly being integrated into structures for health monitoring. Fibre Bragg gratings (FBGs) and their use as sensing elements are described in Dunphy et al, "Optical Fibre Bragg Grating Sensors: A Candidate for Smart Structure Applications", Chapter 10 in Fibre Optic Smart Structures, edited by Eric Udd, John Wiley & Sons, ISBN 0-471-55448-0 (1995). Sensing the shape of an optical fiber is useful in many applications ranging for example, from manufacturing and construction to medicine and aerospace. In some of these applications the shape sensing system must be able to accurately determine the position of the fiber, e.g., within less than one percent of its length. In aerospace applications the tolerance is less than one tenth of one percent of its length.

There are a variety of fiber optic sensing networks capable of effectively sensing position with high accuracy.

For example, U.S. Pat. No. 7,813,599 to Jason Moore issued Oct. 12, 2010 discloses a method of determining the shape of an unbounded optical fiber by collecting strain data along a length of the fiber, calculating curvature and bending direction data of the fiber using the strain data, curve-fitting the curvature and bending direction data to derive curvature and bending direction functions, calculating a torsion function using the bending direction function, and determining the 3D shape from the curvature, bending direction, and torsion functions. An apparatus for determining the 3D shape of the fiber includes a fiber optic cable unbound with respect to a protective sleeve, strain sensors positioned along the cable, and a controller in communication with the sensors. The controller has an algorithm for determining a 3D shape and end position of the fiber by calculating a set of curvature and bending direction data, deriving curvature, bending, and torsion functions, and solving Frenet-Serret equations using these functions.

U.S. Pat. No. 8,773,650 to Froggatt et al. issued Jul. 8, 2014 shows a method for optical position and/or shape sensing with a multi-core fiber. A change in optical length is detected in ones of the cores in the multi-core fiber up to a point on the multi-core fiber. A location and/or a pointing direction are/is determined at the point on the multi-core fiber based on the detected changes in optical length. The accuracy of the determination is better than 0.5% of the optical length of the multi-core fiber up to the point on the multi-core fiber. In a preferred example embodiment, the determining includes determining a shape of at least a portion of the multi-core fiber based on the detected changes in optical length.

See also U.S. Pat. No. 8,970,845 to Chan et al. issued Mar. 3, 2015 which discloses a method and system for rendering the shape of a multi-core optical fiber or multi-fiber bundle in three-dimensional space in real time based on measured fiber strain data. Three optical fiber cores are arranged in parallel at 120 degree intervals about a central axis. A series of fiber Bragg gratings are positioned along the length of each fiber at known intervals, and a tunable laser interrogates the sensors to detect strain on the fiber cores. Software determines the strain magnitude for each fiber at a given triplet and applies beam theory to calculate curvature, beading angle and torsion of the fiber bundle. From there it determines the shape of the fiber in a Cartesian coordinate system by solving a series of differential equations expanded from the Frenet-Serrat equations.

Despite the foregoing a strain-based approach must achieve accuracy to tens of nanostrain (10 parts per billion) levels, and such high accuracy strain measurements are not readily attainable by conventional resistive or optical strain gauges.

Strain rosettes formed of multiplexed FBGs are also known, and are described for example in S. Magne et al, "State of Strain Evaluation With Fibre Bragg Grating Rosettes", Applied Optics, Dec. 20, 1997, Volume 36, No. 36, PP 9437-9447. See also U.S. Pat. No. 6,586,722 to Kenny et al. issued Jul. 1, 2003, which describes strain rosettes in which the strain sensing elements are fiber Bragg gratings and a length of optical fiber connects the gratings in series.

The foregoing references calculate deformation and orientation in a Cartesian coordinate system using well-known Euler rotations within a three-axis x, y, z coordinate system. The Euler approach depends heavily on trigonometric functions and is quite computationally intensive. In addition, the Euler rate equations depend on the secant of the pitch angle which results in a singularity when the pitch reaches ±90 degrees.

The attitude of a body can be uniquely represented in quaternion form, given two vectors defined in the body frame and two external reference points. Quaternion rotations does not involve trigonometric functions and relies only on multiplication and addition. Consequently, the quaternion method can be far more computationally efficient. What is needed is a system and method for quaternion shape sensing that is capable of achieving nanostrain resolutions and including a high-accuracy measurement of the rotation of the fiber in order to correct the calculation of the fiber position. A system and method with such features would have great utility in traditional SHM systems for most any engineering structures including:

monitoring flexible aircraft designs;
providing early indicator of aeroelastic divergence;
provide real-time sensing for structural feedback control;
tether shape sensing for towed glider;
aerial refueling hose line; and
rocket structural health monitoring.

Such a system and method would also find ready application in non-traditional shape sensing applications such as robotic arm position tracking, structural monitoring of medical tools (e.g., flexible endoscopes and other minimally invasive surgical instruments), more traditional civil structures such as buildings, bridges, and wind turbines, or other systems for monitoring and inspection.

SUMMARY OF THE INVENTION

It is, therefore, an object of the present invention to provide a new, more accurate method and system for fiber-optic sensing shape in two and/or three dimensions using single or multi-core optical fibers.

It is another object to eliminate the compound errors that are experienced with other measurement methods, even for complex shapes.

It is still another object of the present invention to provide a method and system for fiber-optic sensing shape in two or three dimensions that is low cost, uses off-the-shelf components and software that can run on standard computing platforms, and which is robust and reliable even in high-temperature and high-pressure environments.

According to the present invention, the above-described and other objects are accomplished by a method and system for rendering the shape and orientation of a three-dimensional structure that analyzes rotation/orientation in quaternion notation. The proposed system and method keeps track of twist/roll angles and updates its effect on pitch and yaw orientations. The system relies on a single or multi-core optical fiber or multi-fiber bundle containing fiber Bragg grating sensors (FBGs) arrayed in rosettes at 45° deltas and spaced at uniform intervals along the entire length of the structure to be monitored. A tunable laser is used to interrogate the sensors using optical frequency domain reflectometry (OFDR), which detects subtle shifts in the wavelength reflected by the sensors in response to strain on the fibers. Each sensor is continuously queried by software which determines the strain magnitude ($\Delta L/L$) for each fiber at a given triplet. Given these measured strain values, the software implements a novel quaternion approach to rendering the 3D shape of the fiber including twist. The novel method applies beam theory in a quaternion numeric system to calculate curvature, bending angle and torsion of the fiber bundle and from that determines the shape of the fiber.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

The present invention is a quaternion-based method and system of rendering the shape of a single or multi-core optical fiber assembly in three-dimensional space in real time based on measured fiber strain data. The optical fiber assembly includes a continuous closed-loop fiber optic core 4 with uniformly-spaced fiber Bragg grating (FBG) sensors 8 arranged in delta-triplets such that the sensors 8 are arrayed at 45° deltas.

Figure 1:
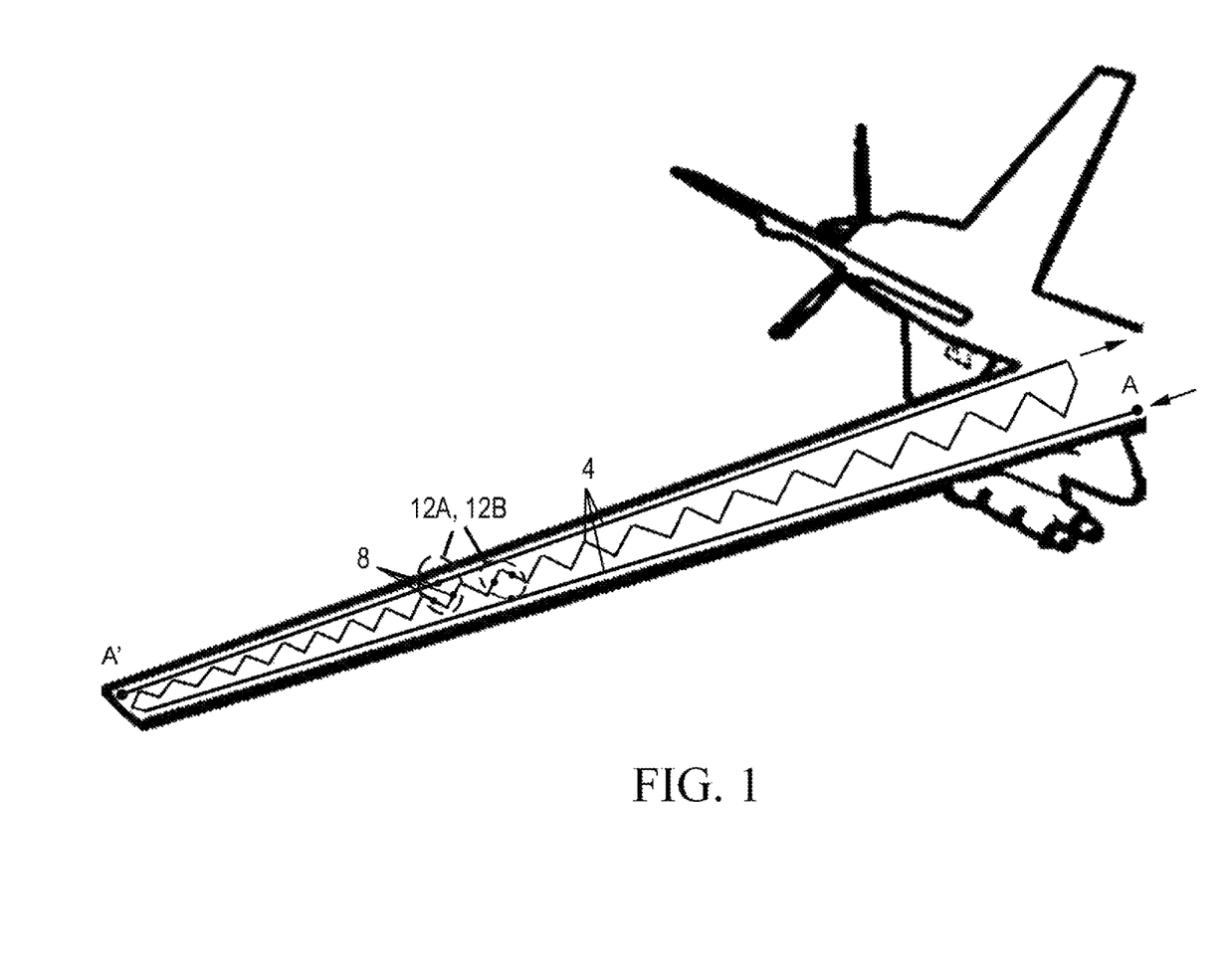
FIG. 1 is a detailed diagram of the sawtooth rosette geometry used in the structural health monitoring (SHM) system 2 of the present invention.

As shown in FIG. 1, the preferred fiber that is used is a single-core optical fiber mounted in a sawtooth configuration in which the single fiber 4 is surface-mounted or embedded along the entire span of the flight control surface (e.g., a wing), running directly end-to-end along the leading edge, doubling back to the near end in a sawtooth pattern that spans the mid-section of the flight control surface, and running directly end-to-end along the trailing edge.

The fiber optic cores 4 extend entirely across a structure to be monitored such as a wing, from fore to aft and top to bottom such that the sensor 8 triplets traverse the structure. This presents a continuous full closed-loop sensor array for each structural element (left wing, right wing, left tail, etc.) which, despite using more fiber per area of coverage, allows for a simplified analysis of strain.

The above-described sawtooth pattern of FIG. 1 creates alternating leading edge rosettes 12B and trailing rosettes 12A at 45° deltas and spaced at uniform intervals along the entire length of the structure to be monitored, each rosette defined by a straight segment and two opposing+/−45 degree segments held fixed in a frame in triangular deltas such that one each delta contains one sensor 8 at each of its three sides. Each co-located trio of sensors 8 defines a strain sensor triplet, and multiple triplets extend across the structure form fore to aft at uniform intervals.

Each delta-segment bears an FBG strain sensor 8. Identical single core fiber patterns are preferably bonded or embedded in the top and bottom of the structure to be monitored, e.g., fully along the entire span of the wing or other structure of interest. This particular sensor 8 layout allows strain rosette calculations to be performed in order to calculate shear strain, and then to calculate twist based on the shear strain as described below. If desired, one two-dimensional sawtooth pattern as described above can be deployed on top, one on the bottom, fore and aft and optionally ends of a three-dimensional structure, and the multiple fibers multiplexed together as described below to produce a comprehensive three-dimensional analysis. One skilled in the art will also understand that the analysis described below can also be used with a multi-core fiber without departing from the scope or spirit of the invention.

Figure 2:
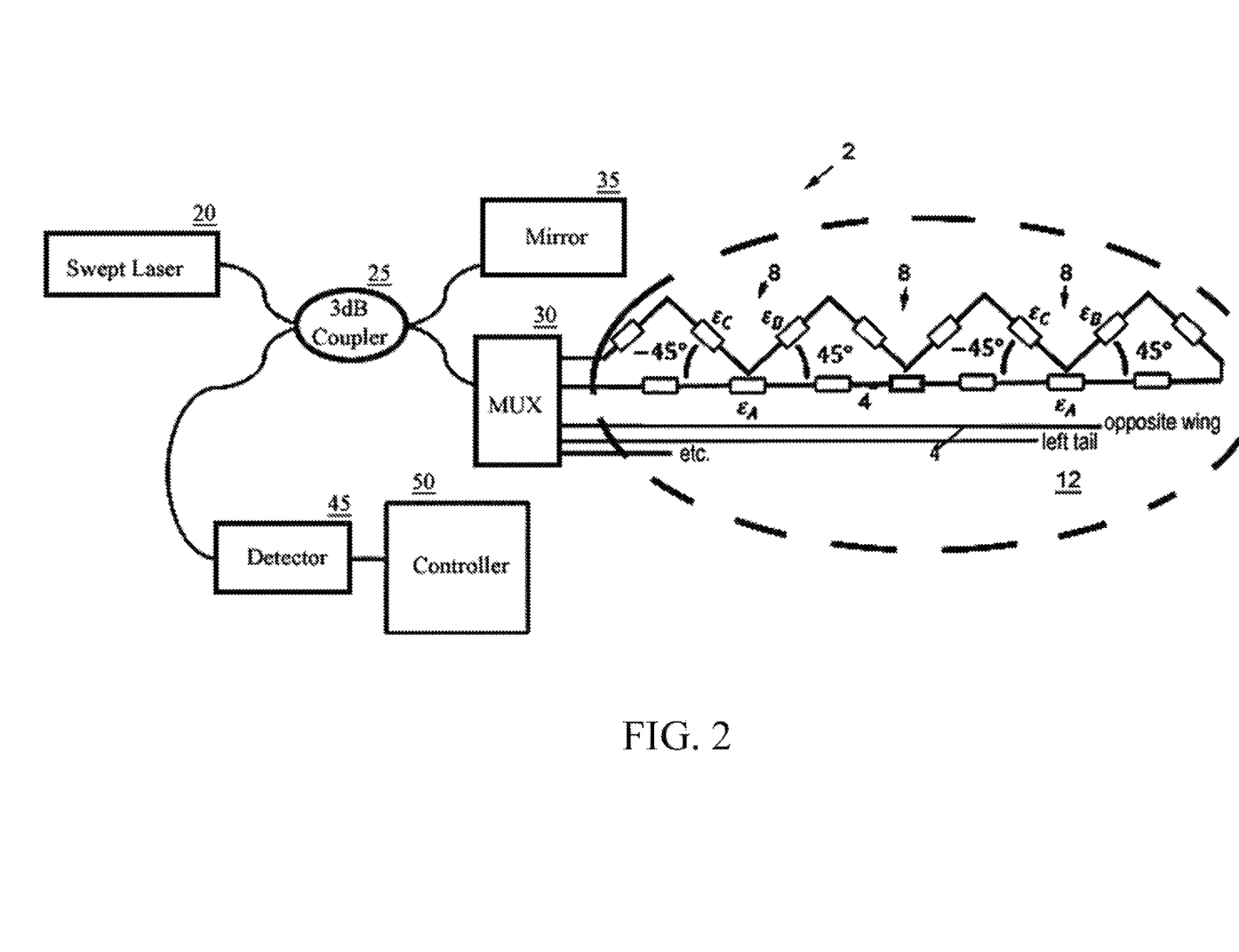
FIG. 2 is a block diagram illustrating the SHM system 2 of FIG. 1.

FIG. 2 is a block diagram illustrating the sawtooth pattern of FIG. 1 implemented in an SHM system 2. The fiber core 4 is seated into a fixed frame 12. The frame maintains the 45 degree separation about a common axis and provides automatic alignment of the optical fiber 4. The respective strain information gained from each of the three sensors 8 of each triplet is inter-correlated. Each individual FBG 8 may experience strain change of $\varepsilon_m$, and the difference of strain between two FBGs 8 is $\Delta\varepsilon_{mn}$ yielding three discrete strain values $\varepsilon_A$, $\varepsilon_B$, $\varepsilon_C$ for each rosette triplet. Thus, by translating the strain components $\varepsilon_A$, $\varepsilon_B$, $\varepsilon_C$ at each triplet the 3D shape and orientation of the fiber 4 can be resolved and rendered. Twist is important because the twist of a structure (e.g., a wing) may change its behavior. For example, twist on a wing may result in a change in the angle of attack of the airfoil, which in turn changes the lift profile over the wing. A flexible wing may have the strength to carry the gross weight of a vehicle but could be susceptible to aeroelastic divergence given enough deformation. To measure the twist of a wing in real time, a strain based twist sensing method is also disclosed, yielding a strain-based 3D shape, orientation and twist quaternion sensing software program 50.

SHM system 2 includes strain sensors 8 which may be any suitable strain sensor, but are preferably Fiber Bragg Grating (FBG) sensors. There are a variety of known FBG structures including uniform positive-only index change, Gaussian apodized, raised-cosine apodized, chirped, discrete phase shift, or superstructure, and any of the foregoing will suffice. Alternatively, Rayleigh scatter detectors or other strain sensors of the type known in the art can also be used within the scope of the invention.

The sensors 8 are adapted to measure strain data, and to relay the strain data to a controller 50. The controller 50 is provided with analytical software for determining the shape of the optical fiber core 4 by differential strain data as will be described.

As shown in FIG. 2, it is important that each optical fiber 4 be bonded or embedded to the structure to be monitored, such that sensors 8 are all at calibrated positions. Confining the sensors 8 to bend, twist and untwist relative to each other and in accordance with the surface of the structure being monitored enables the laws of flexible beam theory to apply, while also permitting explicitly-defined value of curvature, bending angle, and torsion.

Referring back to FIG. 2 a tunable swept laser 20 is used to interrogate the sensors 8 using optical frequency domain reflectometry, which detects subtle shifts in the wavelength reflected by the sensors in response to strain on the fibers. Each sensor 8 is continuously queried, and where multiple fibers 4 are used for different structural members the fiber reflections are multiplexed by multiplexer (MUX) 30 to a conventional 3 dB fiber optic coupler 25, are then captured on an optical detector 45, and the detector output is sent to controller 50 for analysis by software analytics (described below) that determine the strain magnitude e at each sensor 4.

The software resident in controller 50 includes programmed instructions for carrying out an analytical method that determines the shape of the fiber assembly 2 utilizing distributed strain measurements over a structure and the Quaternion number system for representation of rotations. The Quaternion number system includes three complex numbers, where each complex number i, j, k are defined by:

$$i^2=j^2=k^2=ijk=-1$$

and $$jk=-kj=i$$

$$ki=-ik=j$$

$$ij=-ji=k$$

One skilled in the art will also understand that the dual quaternion and octonion numbering system could be used in place of the quaternion numbering system described without departing from the scope or spirit of the invention.

Figure 3:
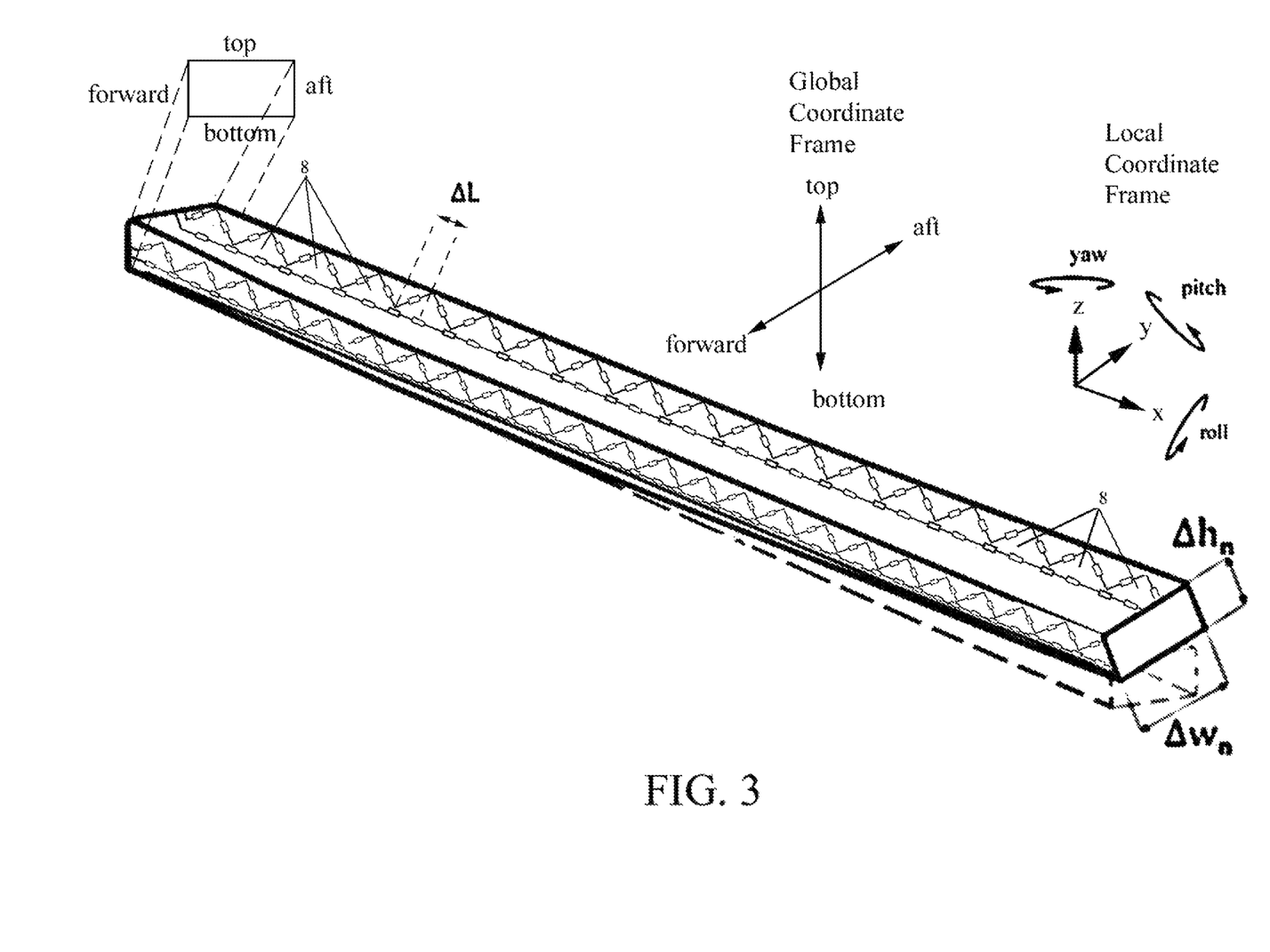
FIG. 3 is a perspective model of the structural health monitoring (SHM) system 2 applied to an airfoil shown for definition of variables and coefficients of FIG. 2.

FIG. 3 is a perspective model of the sawtooth pattern of FIG. 1 implemented along a fixed frame 12 comprising an airfoil shown for definition of variables and coefficients. The system 2 of FIG. 2 monitors displacement of the flexible airfoil structure using strain measurements taken along the structure. The formulation of the displacement theory for the non-uniform airfoil is based upon the modified beam equations first described by Dr. William Ko and Dr. W. Lance Richards (see, U.S. Pat. No. 7,520,176 issued Apr. 21, 2009). The Ko/Richards work, as well as this application, in turn, uses beam theory (of a bending body) to calculate curvature, bending angle and torsion of the entire fiber assembly 2 based on empirically collected strain data.

The Classical Beam Theory (Euler-Bernoulli) is utilized to relate measured strain to the theoretical curvature, slope, and deflection of beams structures. Flexural rigidity of the beam is defined as EI ($Nm^2$). The Euler-Bernoulli equation is the general differential equation that describes the relationship between load and shape of a beam.

$$EI\frac{d^4y(x)}{dx^4}=w(x) \quad (1)$$

Where the variable x is the distance of the beam starting at the wing root and ending at the tip of the beam, y(x) is the displacement of a beam as a function of distance from the root, w(x) is the loading function analogous to the lift generated by the wing, E is the elastic modulus also known as the Young's Modulus, I is the second moment of area that is calculated with respect to the centroidal axis perpendicular to the applied loading, and $\Delta L$ is the sensor 8 spacing as shown. However, for present purposes the shape sensing algorithm can be applied without knowing any of the parameters in equation (1). With reference to FIG. 3 all that is required is $\Delta h_n$, $\Delta w_n$ and $\Delta L$, plus the strain readings from the fiber optic sensor triplets 8, and a suitable coordinate frame. Either a global and/or local coordinate systems may be used. A global coordinate system can be thought of as an absolute reference frame, but in many cases it may be more convenient to use a local coordinate system, with origin offset from the global origin. That is the case in FIG. 3 a global coordinate frame is used to define top/bottom and forward/aft. However, the forward/aft directions are aligned in the Y-axis of a local coordinate frame, and top and bottom are aligned with the Z-axis of the local coordinate frame. The X-axis of the local coordinate frame relates to the span of the structure and rotation about the X-axis relates to roll. The present software method was implemented in a local coordinate frame as shown with sensors 8 oriented in the span-wise direction defining the X-axis. The aft and bottom sides of the beam are hidden from view. One skilled in the art should understand that the choice of coordinate frame is almost arbitrary, and what matters most is consistency when applying the software the strain sensor 8 readings.

Figure 4:
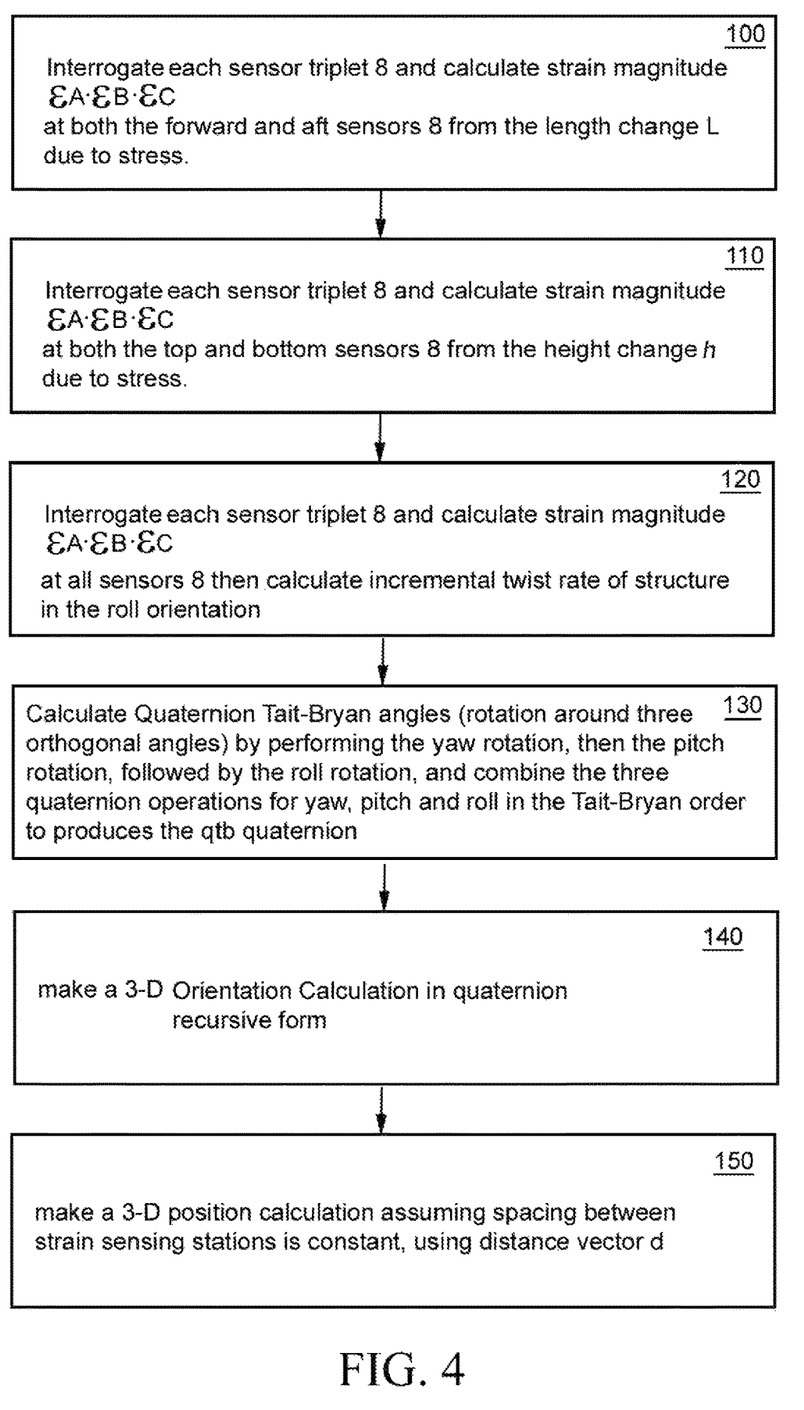
FIG. 4 is a block diagram showing the sequential software steps of processor 50 used in the system 2 of FIG. 2.

In essence, the software method of real-time shape sensing comprises the individual steps shown in FIG. 4.

At step 100, laser 20 interrogates each sensor triplet 8 and the controller 50 determines the strain magnitude ($\varepsilon_A$, $\varepsilon_B$, $\varepsilon_C$) at both the forward and aft sensors 8 from the length change L due to stress. To do this, with reference to FIG. 3, the software calculates the curvature of the structure in the yaw orientation by comparing a strain measurement on the forward-most and aft-most sensors 8 on the surface of the structure, and dividing by the distance $\Delta W_n$ between the two measurements. The incremental yaw angle change is found by multiplying the curvature by the sensing element length. To calculate yaw, you must find $\in_{forward}$ and $\in_{aft}$. The incremental angle is defined as:

$$\Delta \psi_n = \Delta \text{yaw}_n = \frac{\in_{aft,n} - \in_{forward,n}}{\Delta W_n} \cdot \Delta L \tag{2}$$

The quaternion form of the incremental yaw rotation is defined as:

$$q_{\psi,n} = \cos\left(\frac{\Delta \psi_n}{2}\right) + [0i + 0j + 1k] \cdot \sin\left(\frac{\Delta \psi_n}{2}\right) \tag{3}$$

At step 110, given the Quaternion Yaw (curvature of a structure in the yaw orientation) the controller 50 next determines the Quaternion Pitch. This is done by interrogating each sensor triplet 8, determining the strain magnitude ($\varepsilon_A$, $\varepsilon_B$, $\varepsilon_C$) at both the topmost and bottom-most sensors 8 (on the top and bottom surface of the structure), and dividing by the distance between the two measurements. The incremental pitch angle change is found by multiplying the curvature by the sensing element length. To calculate pitch, the controller 50 software must find $\in_{top}$ and $\in_{bottom}$. The incremental pitch angle is defined as:

$$\Delta \theta_n = \Delta \text{pitch}_n = \frac{\in_{bottom,n} - \in_{top,n}}{\Delta h_n} \cdot \Delta L \tag{4}$$

The quaternion form of the incremental pitch rotation is defined as:

$$q_{\theta,n} = \cos\left(\frac{\Delta \theta_n}{2}\right) + [0i + 1j + 0k] \cdot \sin\left(\frac{\Delta \theta_n}{2}\right) \tag{5}$$

At step 120, given both the Quaternion Yaw and Quaternion Pitch, the controller 50 determines Quaternion Roll (incremental twist rate of a structure in the roll orientation). This is done by interrogating each sensor triplet 8, determining the strain magnitude ($\varepsilon_A$, $\varepsilon_B$, $\varepsilon_C$) at all sensors 8. Calculating incremental twist rate in the roll orientation utilizes a shear strain to twist rate relationship. To calculate yaw, the controller 50 first obtains γ by utilizing rosettes. The incremental roll angle is defined as:

$$\Delta \varnothing_n = \Delta \text{roll}_n = K_{\varnothing_n} \cdot \gamma_n \cdot \Delta L \tag{6}$$

The quaternion form of the incremental roll rotation is defined as:

$$q_{\varnothing,n} = \cos\left(\frac{\Delta \varnothing_n}{2}\right) + [1i + 0j + 0k] \cdot \sin\left(\frac{\Delta \varnothing_n}{2}\right) \tag{7}$$

One skilled in the art will readily understand that steps 100, 110, 120 may be performed in any sequence, inasmuch as determining Quaternion Yaw, Quaternion Pitch, and Quaternion Roll may be carried out in any order. What is important is that all three (steps 100, 110, 120) are known and per step 130 below quaternion rotations for roll pitch and yaw combined for each closed-loop leg or "sensing station" as shown in FIG. 2.

At step 130, given all the Quaternion Yaw, Quaternion Pitch, and Quaternion Roll, the controller 50 determines Quaternion Tait-Bryan angles (rotation around three orthogonal angles) by performing the yaw rotation, then the pitch rotation, followed by the roll rotation. Combining the three quaternion operations for yaw, pitch and roll in the Tait-Bryan order produces the $q_{tb}$ quaternion.

$$q_{tb,n} = q_{\varnothing,n} \cdot q_{\theta,n} \cdot q_{\psi,n} \tag{8}$$

$$q_{tb,n} = \begin{bmatrix} \cos(\varnothing_n/2)\cos(\theta_n/2)\cos(\psi_n/2) + \\ \sin(\varnothing_n/2)\sin(\theta_n/2)\sin(\psi_n/2) + \\ \sin(\varnothing_n/2)\cos(\theta_n/2)\cos(\psi_n/2) - \\ \cos(\varnothing_n/2)\sin(\theta_n/2)\sin(\psi_n/2) \cdot i + \\ \cos(\varnothing_n/2)\sin(\theta_n/2)\cos(\psi_n/2) + \\ \sin(\varnothing_n/2)\cos(\theta_n/2)\sin(\psi_n/2) \cdot j + \\ \cos(\varnothing_n/2)\cos(\theta_n/2)\sin(\psi_n/2) - \\ \sin(\varnothing_n/2)\sin(\theta_n/2)\cos(\psi_n/2) \cdot k \end{bmatrix} \tag{9}$$

At step 140 controller 50 executes a 3-D Orientation Calculation in quaternion
Recursive Form:

$$q_n = q_{tb_n} \cdot q_{n-1} \tag{10}$$

Product Form:

$$q_n = \left(\prod_{i=1}^{n} q_{tb(n-i+1)}\right) \cdot q_0 \tag{11}$$

Where the multiplication of $q_0$ is optionally included if the boundary conditions are known.
Orientation in Global Coordinates:

$$q_n = \cos\left(\frac{\Delta \alpha_n}{2}\right) + [u_{x,n}i + u_{y,n}j + u_{z,n}k] \cdot \sin\left(\frac{\Delta \alpha_n}{2}\right) \tag{12}$$

$$q_n = a + bi + cj + dk \tag{13}$$

$$\text{roll} = \varnothing_n = \text{atan2}[2 \cdot (a \cdot b + c \cdot d), 1 - 2 \cdot (b^2 + c^2)] \tag{14}$$

$$\text{pitch} = \theta_n = \arcsin[2 \cdot (a \cdot c - d \cdot b)] \tag{15}$$

$$\text{yaw} = \psi_n = \text{atan2}[2 \cdot (a \cdot d + b \cdot c), 1 - 2 \cdot (c^2 + d^2)] \tag{16}$$

Finally, at step 150 controller 50 makes a 3-D position calculation. Assigning the spacing between strain sensing stations as $\Delta L_n$, the distance vector $d_n$ can be defined as.

$$d_n = 0 + [\Delta L_n i + 0j + 0k] \tag{17}$$

where the local x-axis has a length of $\Delta L_n$, and the y-axis and z-axis have a length of zero.

$$\text{recursive form } p_n = p_{n-1} + q_n \cdot d \cdot q_n^{-1} = [0 + x_n + y_n + z_n] \tag{18}$$

$$\text{summation form } p_n = \sum_{i=1}^{n} q_n \cdot d_n \cdot q_n^{-1} = [0 + x_n + y_n + z_n] \tag{19}$$

The above-described method provides 3D shape and orientation. In addition to the foregoing, the present system 2 may optionally perform the following calculations. It should now be apparent that the above-described system and method uses differential strain measured between FBGs spaced along a structure to render displacement of shape and/or orientation of a three-dimensional structure in real time based on measured fiber strain data using quaternion kinematic shape sensing. The result can be calculated in real time and plotted, based on standard FBG strain data.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed:

1. A fiber optic strain sensor, comprising:
   an optical fiber assembly comprising at least one optical fiber core having a plurality of strain sensors disposed lengthwise there along and configured in a sawtooth pattern triplet rosettes, said optical fiber core extending across a structure to be monitored from end-to-end; and
   a programmable controller comprising a processor and software stored on non-transitory storage media for carrying out the steps of,
      determining quaternion yaw by interrogating fore and aft sensors and measuring strain magnitude caused by a change in length of said structure, calculating the curvature of the structure in the yaw orientation
      determining quaternion pitch by interrogating top and bottom sensors and calculating strain magnitude caused by a change on length of said structure;
      determining quaternion roll by interrogating all of said plurality of sensors and calculating incremental twist rate in the roll orientation utilizing a shear strain to twist rate relationship;
      determining quaternion Tait-Bryan angles by performing a yaw rotation, then a pitch rotation, followed by a roll rotation;
      combining the three quaternions for yaw, pitch and roll in the Tait-Bryan order to produce a qtb quaternion;
      determining 3-D orientation from said qtb quaternion;
      determining 3-D position from said qtb quaternion.

2. The fiber optic strain sensor according to claim 1, wherein said optical fiber assembly consists of a single optical fiber core.

3. The fiber optic strain sensor according to claim 2, wherein said single optical fiber core is affixed to said structural member in a sawtooth pattern.

4. The fiber optic strain sensor according to claim 3, further comprising a plurality of Fiber Bragg Gratings (FBGs) spaced along said single optical fiber core and configured in said sawtooth pattern as delta-rosettes.

5. The fiber optic strain sensor according to claim 3, wherein said structural member comprises a wing and said sawtooth pattern extends end-to-end along said wing.

6. The fiber optic strain sensor according to claim 5, wherein said delta-rosettes span from leading edge to trailing edge of said wing.

7. The fiber optic strain sensor according to claim 6, wherein some of said delta-rosettes are more proximate the leading edge of said wing and others of said delta-rosettes are more proximate the trailing edge of said wing.

8. The fiber optic strain sensor according to claim 3, further consisting of three FBGs aligned at 45 degree angles per each delta-rosette.

9. A method of monitoring a structure using an optical fiber core having a plurality of strain sensors disposed lengthwise there along, said optical fiber core being attached along a surface of said structure in a sawtooth pattern to define sensor triplets, the method comprising the steps of:
   interrogating each sensor triplet and measuring strain magnitude at each said triplet;
   calculating quaternion yaw rotation by subtracting strain magnitude at a forward-most sensor triplet from strain magnitude at a aft-most sensor triplet and dividing by the distance between the two measurements;
   calculating quaternion pitch rotation by subtracting strain magnitude at a top-most sensor triplet from strain magnitude at a bottom-most sensor triplet and dividing by the distance between the two measurements;
   calculating quaternion roll as a function of shear strain at all of said sensor triplets;
   calculating quaternion Tait-Bryan angles by performing a yaw rotation, a pitch rotation, and a roll rotation;
   calculating 3D shape and orientation of said structure.

10. The method of monitoring a structure according to claim 9, wherein said structure is a wing.

11. The method of monitoring a structure according to claim 9, further comprising a first optical fiber core surface-mounted across a top surface of said structure and a second optical fiber core surface-mounted across a bottom surface atop said structure.

12. The method of monitoring a structure according to claim 11, wherein both of said first and second optical fiber cores are patterned in a sawtooth configuration.

13. A method of monitoring twist and orientation a structural member by measurement of strain, comprising the steps of:
   mounting a plurality of strain sensors configured as delta rosettes across said structural member from end-to-end;
   determining Quaternion Yaw by interrogating fore and aft sensors and calculating strain magnitude thereof caused by a change on length of said structure;
   determining Quaternion Pitch by interrogating top and bottom sensors and calculating strain magnitude thereof caused by a change on length of said structure;
   determining Quaternion Roll by interrogating all of said plurality of sensors and calculating incremental twist rate in the roll orientation utilizing a shear strain to twist rate relationship;
   determining Quaternion Tait-Bryan angles by performing a yaw rotation, then a pitch rotation, followed by a roll rotation;
   combining the three quaternions for yaw, pitch and roll in the Tait-Bryan order to produce a qtb quaternion;
   determining 3-D orientation from said qtb quaternion;
   determining 3-D position from said qtb quaternion.

14. The method of monitoring twist and orientation a structural member according to claim 13, wherein said structural member is a wing.

15. The method of monitoring twist and orientation a structural member according to claim 13, wherein said step of mounting a plurality of strain sensors further comprises mounting a first optical fiber in a sawtooth configuration across one structural member, and mounting a second optical fiber in a sawtooth configuration across another structural member.

16. The method of monitoring twist and orientation a structural member according to claim 15, wherein said step of mounting a plurality of strain sensors further comprises mounting a first optical fiber in a sawtooth configuration across one structural member, and mounting a second optical fiber in a sawtooth configuration across another structural member.

17. A method of monitoring twist and orientation a structural member comprising the steps of:
- applying a single core optical fiber with a plurality of spaced FBGs to said structural member, said FBGs being configured in triplets as delta-rosettes;
- measuring strain at each of said strain rosettes;
- calculating shear strain along said structural member as a function of said measured strain at all of said strain rosettes;
- determining 3-D orientation of said structural member in a quaternion coordinate system; and
- determining 3-D position from said 3-D orientation in said quaternion coordinate system.

* * * * *